(12) United States Patent
Hayes et al.

(10) Patent No.: US 7,058,524 B2
(45) Date of Patent: Jun. 6, 2006

(54) ELECTRICAL POWER METERING SYSTEM

(75) Inventors: Paul V. Hayes, Union City, NJ (US); Daniel T. Morella, Highland Mills, NY (US)

(73) Assignee: Hudson Bay Wireless, LLC, Union City, NJ (US)

( * ) Notice: Subject to any disclaimer, the term of this patent is extended or adjusted under 35 U.S.C. 154(b) by 0 days.

(21) Appl. No.: 10/280,533

(22) Filed: Oct. 25, 2002

(65) Prior Publication Data

US 2004/0083066 A1    Apr. 29, 2004

(51) Int. Cl.
*G06F 19/00*    (2006.01)

(52) U.S. Cl. ............... 702/62; 702/57; 702/189; 340/870.01; 709/217; 375/220; 375/222; 379/90.01; 379/106.03; 700/1; 700/73; 700/90

(58) Field of Classification Search ............... 702/57, 702/60–62, 189, 190; 340/870.01; 709/100, 709/102; 375/220, 222; 379/90.01, 106; 700/1, 73, 90

See application file for complete search history.

(56) References Cited

U.S. PATENT DOCUMENTS

| | | | |
|---|---|---|---|
| 5,481,259 A | 1/1996 | Bane | 340/870.03 |
| 5,493,287 A | 2/1996 | Bane | 340/825.52 |
| 5,631,636 A | 5/1997 | Bane | 340/825.69 |
| 5,699,276 A * | 12/1997 | Roos | 379/106.03 |
| 5,726,646 A | 3/1998 | Bane | 340/870.03 |
| 5,748,104 A | 5/1998 | Argyroudis et al. | 340/870.11 |
| 5,930,773 A | 7/1999 | Crooks et al. | 705/30 |
| 6,035,285 A | 3/2000 | Schlect et al. | 705/30 |
| 6,088,688 A | 7/2000 | Crooks et al. | 705/412 |
| 6,122,603 A | 9/2000 | Budike, Jr. | 702/182 |
| 6,128,290 A * | 10/2000 | Carvey | 370/347 |
| 6,133,850 A | 10/2000 | Moore | 340/870.02 |
| 6,150,955 A | 11/2000 | Tracy et al. | 340/870.02 |
| 6,195,018 B1 | 2/2001 | Ragle et al. | 340/870.01 |
| 6,246,677 B1 | 6/2001 | Nap et al. | 370/346 |
| 6,300,881 B1 | 10/2001 | Yee et al. | 340/870.02 |
| 6,311,105 B1 | 10/2001 | Budike, Jr. | 700/291 |
| 6,366,622 B1 * | 4/2002 | Brown et al. | 375/322 |
| 2001/0010490 A1 | 8/2001 | Bellin | 340/7.46 |

(Continued)

OTHER PUBLICATIONS

Thumaty et al., 'Development of Low-IF Receiver and a Fixed Wireless Utility Network', Mar. 2002, IEEE, pp. 935-938 □□.*

(Continued)

*Primary Examiner*—Marc S. Hoff
*Assistant Examiner*—Elias Desta
(74) *Attorney, Agent, or Firm*—McCarter & English, LLP

(57) ABSTRACT

A wireless electrical power metering system is provided. A processor having a multichannel power line transceiver, a wireless transceiver, and a power meter attached thereto measures power consumption information on a power line inductively coupled with the power meter. The processor converts the power consumption information into IP-based data, and transmits same over the wireless transceiver. The information can be wirelessly received by a remote monitoring station or transmitted across the Internet for storage, analysis, and billing. The processor generates appliance control signals and generates same across the multichannel power line transceiver to remotely control appliances in response to power consumption trends. The processor provides firewall capabilities, and relays information between a wired or wireless network and a power line network, thereby expanding the size of existing household networks. Further, the processor allows multiple dwellings to be networked using power lines, and households to be connected to the Internet via a power line network.

37 Claims, 8 Drawing Sheets

U.S. PATENT DOCUMENTS

| | | | |
|---|---|---|---|
| 2002/0013858 A1 | 1/2002 | Anderson | 709/245 |
| 2002/0018545 A1 | 2/2002 | Crichlow | 379/106.03 |
| 2002/0024424 A1 | 2/2002 | Burns et al. | 340/310.01 |
| 2002/0038279 A1 | 3/2002 | Samuelson et al. | 705/37 |
| 2002/0045992 A1 | 4/2002 | Shincovich | 702/58 |
| 2002/0054619 A1 | 5/2002 | Haas | 375/133 |
| 2002/0169848 A1* | 11/2002 | Esterman | 709/217 |
| 2003/0009401 A1* | 1/2003 | Ellis | 705/35 |

OTHER PUBLICATIONS

Ando et al., 'Automatic Meter Reading System adopting automatic routing technology', Jan. 2002, IEEE, pp. 2305-2309.*

Anderson et al., 'Unique EHV Current Probe for Calibration and Monitoring', Jan. 2001, IEEE, pp. 379-384.*

Delsing et al., 'The IP-Meter, Design Concept and Example Implementation of an Internet Enabled Power Line Quality Meter'), IEEE Article, May 2000, pp. 657-660.*

Circon 200-Series Products- Map diagram from Circon web site- http://www.circon.com/products/product-map.htm .(1 page).

Lappin, "Country Road Warrior," Wired, Issue 3.08, Aug., 1995 (1 page).

"What were the Key Project Milestones—How Has the Project Evolved Over Time?," printout from http://www.glasgow-ky.com/epb/faq01.htm#Question7 (1 page).

* cited by examiner

ELECTRICAL POWER METERING SYSTEM

BACKGROUND OF THE INVENTION

1. Field of the Invention

The present invention relates to power consumption measurement, and more specifically, to an electrical power metering system for measuring electrical power consumption, converting the measurements to IP format, and delivering the information in one or more wired or wireless networks.

2. Related Art

In today's society, electrical power is being consumed at an increasing rate. As individuals continue to purchase electronic equipment, such as stereos, televisions, DVD players, personal computers, appliances, air conditioners, and other similar devices, the demand for electrical power increases. Further, increased electrical power consumption also results in an increase in the cost of electric utility bills.

Conventional power utility meters represent a type of energy consumption monitoring technology that is frequently used in residential and commercial settings. Such meters are predominantly analog (electromechanical), but digital models have also been developed. Frequently, a single power utility meter, whether analog or digital, services a multifamily dwelling and does not accurately reflect power consumption by individual families or occupants of the dwelling. Inaccuracies in billing can result, as many families split the total utility bill for the dwelling evenly and without regard to actual power consumption by each occupant. In addition to these shortcomings, current electrical power meters do not provide the ability to identify locations in the building where power is most frequently consumed and/or wasted.

Power metering systems using radio frequency ("RF") to remotely measure electrical power consumption have in the past been developed. Such systems, however, require the installation of numerous components at the dwelling. Further, these systems often require the presence of an RF back-haul station or base unit, and do not allow for the direct connection of the meter to the Internet via a wired or wireless network connection. Moreover, there has yet to be developed a wireless power metering system that allows for the transmission of power consumption data, in addition to standard network data, over one or more power lines within a dwelling.

Accordingly, what would be desirable, but has not yet been provided, is a wireless electrical power metering system that allows for the monitoring of electrical power consumption within a dwelling while providing both wired and wireless network connectivity.

SUMMARY OF THE INVENTION

The present invention relates to a wireless electrical power metering system. The invention comprises a computer or processor connected to a power line meter, a multichannel power line transceiver, and a wireless interface. The power line meter measures power consumption information, and the processor converts same for transmission as standard Internet Protocol (IP) traffic across a network. The processor can be connected to a household local area network (LAN), a wireless area network, a power line data network, or the Internet. Power consumption information can be measured and transmitted to a wireless monitoring station, one or more computers within the household, or directly to a utility company via the Internet. Appliances located in the dwelling can be selectively controlled by the processor to maximize energy savings.

The present invention also provides network connectivity between a power line network and an existing wired or wireless network within the dwelling. Information transmitted on the wired or wireless network is converted by the processor of the present invention for transmission across the power line. Multiple networks within the dwelling can be inter-networked, and firewall functionality can be provided by the processor. The present invention also includes a filtration device for controlling the flow of data across the power line.

BRIEF DESCRIPTION OF THE DRAWINGS

These and other important objects and features of the invention will be apparent from the following Detailed Description of the Invention, taken in connection with the accompanying drawings, in which.

DETAILED DESCRIPTION OF THE INVENTION

The present invention relates to a wireless electrical power metering system. A computer, connected to a wireless transceiver, a multichannel power line transceiver, and a power meter that measures power consumption data from the power line, converts the measured data to IP format for transmission across a wired or wireless network. The present invention can also remotely control appliances in response to power consumption trends, and provides network connectivity and firewall capabilities between an existing network within a dwelling and a power line network. A wireless monitoring station allows power consumption data to be remotely monitored.

Figure 1:
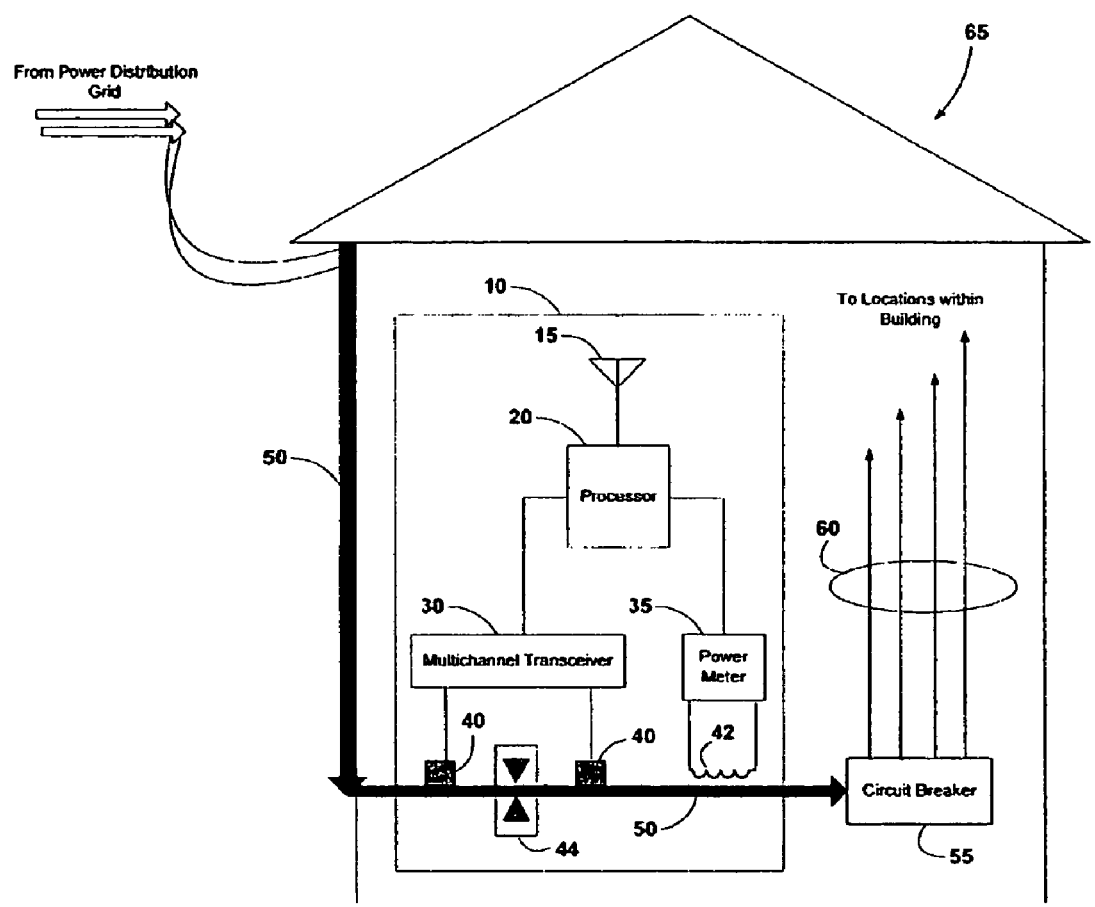
FIG. 1 is a schematic diagram showing the wireless power metering system of the present invention.

FIG. 1 is a schematic diagram showing the wireless power metering system of the present invention, indicated generally at 10 and installed in a dwelling 65. A power line 50 connects the dwelling 65 to the local power distribution grid. The power line 50 can be any power line known in the art, such as a single phase, two-phase, or three-phase power line operating at any acceptable voltage (e.g., 120 or 240 volts). Power line 50 is connected to a conventional circuit breaker 55, and electricity provided therefrom is distributed to various locations within the building via cables 60. In a preferred embodiment of the present invention, the power metering system 10 measures power consumption information on power line 50, before the circuit breaker 55. However, it is to be expressly understood that the power metering system 10 could be placed at any desired location along a power line within a single-family dwelling, multi-family dwelling, commercial business, or elsewhere, to measure power consumption data. For example, the power metering system 10 could be installed on one of the cables 60 to analyze power consumption trends on a given electrical branch stemming from circuit breaker 55. Further, measurement of power consumption in multi-family dwellings can be achieved by positioning a plurality of power metering systems 10 of the present invention at various locations throughout the dwelling (e.g., by placing a single power metering system on each electrical branch that provides electricity for each family within the dwelling).

The power metering system 10 includes an antenna 15, processor 20, multichannel transceiver 30, power meter 35, one or more clamp contacts 40, split-core transformer 42, and clamp filter 44, which operate together to provide data acquisition, power measurement, data conversion, and data transmission services. Clamp filter 44 preferably makes inductive contact with power line 50. Split-core transformer 42 is inductively coupled with power line 50 and senses fluctuations in current flow in power line 50, the fluctuations being indicative of rising and falling power consumption rates within the dwelling 65. Output from the transformer 42 is fed to power meter 35 for processing.

In a preferred embodiment of the present invention, power meter 35 is an ADE7756 active energy metering IC with a serial interface, manufactured by Analog Devices, Inc. The ADE7756 incorporates two second-order, sigma-delta analog-to-digital (A/D) converters, reference circuitry, and associated signal processing circuitry to perform active power measurement from power line 50. Real-time power consumption information, when processed by the ADE7756, is output in the form of a serial data signal capable of being read by any serial device (e.g., an RS-232 data port). Of course, any known power meter capable of producing a serial output signal corresponding to power consumption information can be substituted without departing from the spirit or scope of the present invention. The output from power meter 42 is fed to processor 20 and converted for transmission across a wired or wireless network, as will hereinafter be described in more detail.

The power metering system 10 includes a multichannel transceiver 30 that allows transmission of data, including power consumption, appliance control, and network data, across the power line 50. The multichannel transceiver 30 interfaces with power line 50 via one or more clamp contacts 40, or any other interface such as a direct plug connection into an outlet on the power line 50. Importantly, transceiver 30 allows the processor 20 of power metering system 10 to transmit and receive IP data from power line 50 using known power line protocols such as X-10 or HomePlug. The X-10 protocol allows communication between appliances (e.g., lamps, fans, televisions) in stand-alone networks of 128 or fewer nodes.

The HomePlug protocol allows for the transmission of IP data across power lines at speeds of up to 13.75 Mbits/second, with guaranteed Quality of Service (QoS). The HomePlug protocol interfaces with the Media Access Control (MAC) layer of the software, allowing IP data to be transmitted over power lines. In a preferred embodiment of the present invention, transceiver 30 comprises a VS6801 CMOS chip manufactured by Valence Semiconductor, Inc. The VS6801 chip combines analog-to-digital (AID) converters, digital-to-analog (D/A) converters, signal conditioning circuitry, and power line interface circuitry to allow transmission of data across power line 50 using Internet Protocol over the HomePlug protocol. Transceiver 30 preferably allows the transmission of data across power line 50 using both the X-10 and HomePlug protocols. Other protocols, of course, are considered within the scope of the present invention.

The power metering system 10 also includes a filter 44 for selectively filtering data transmitted across power line 50. The filter 44 prevents undesired X-10 and IP data extant on power line 50 and originating from a source outside of dwelling 65 from entering the power lines therein. Further, the filter 44 prevents selected X-10 and IP data generated within dwelling 65 from exiting power line 50 and being transmitted across the power distribution grid. Moreover, the filter 44, in conjunction with the processor 20, provides the capability of allowing both internal and external X-10 signals to selectively control appliances within a household. In a preferred embodiment of the present invention, the filter 44 is a clamp filter designed to filter out X-10 frequencies external to the dwelling 65.

Figure 2:
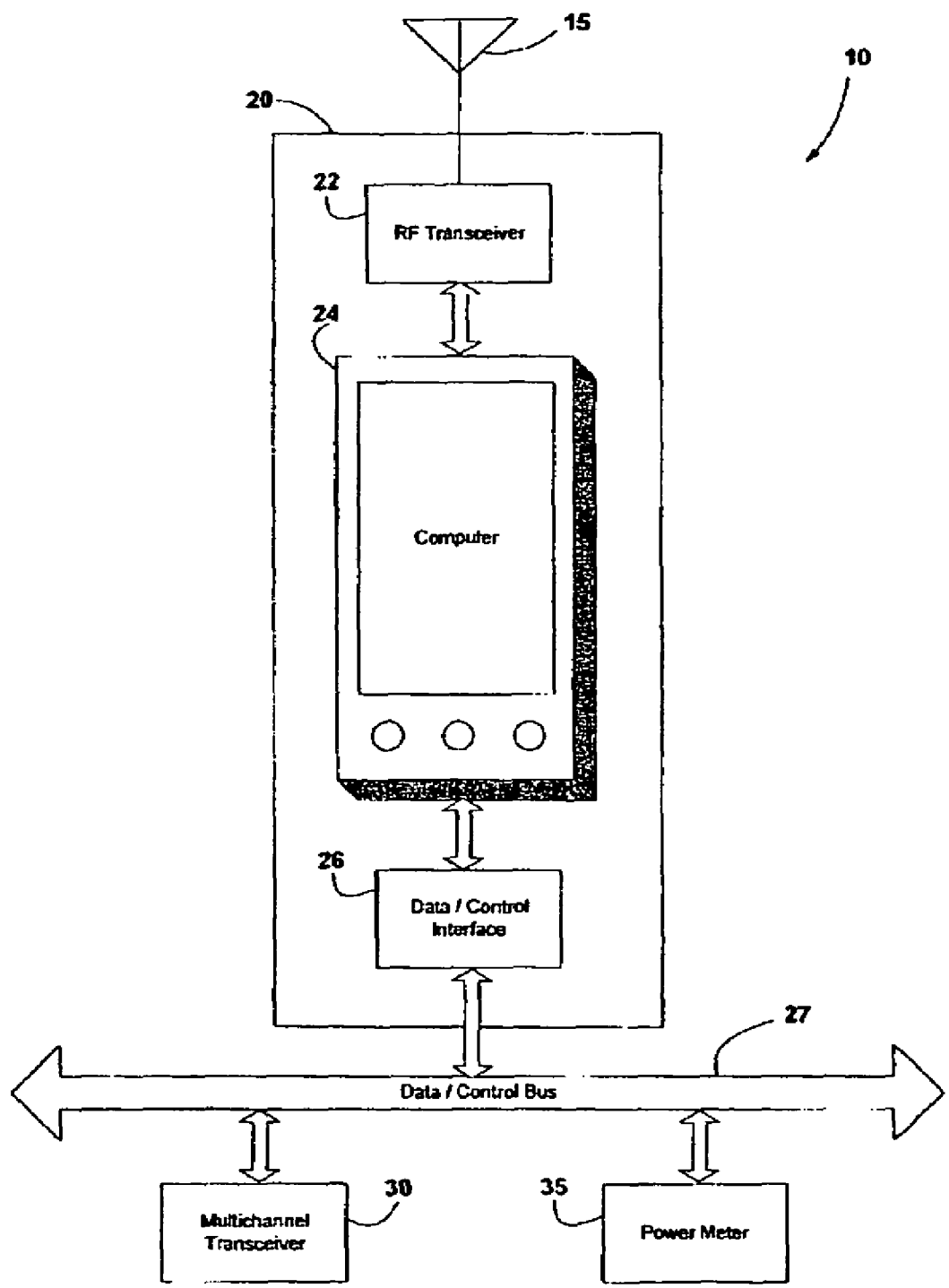
FIG. 2 is a block diagram showing the wireless power metering system of the present invention in greater detail.

FIG. 2 is a block diagram showing the power metering system 10 of the present invention in greater detail. The processor 20 of the present invention comprises an RF transceiver 22 connected to antenna 15, a computer 24, and a data/control interface 26 connected to the computer 24. The RF transceiver 22 receives and transmits data between the computer 24 and a wireless network. Transceiver 22 could be substituted with a wired network interface, such as a 10-Base-T, 100-Base-T, or Gigabit Ethernet interface, without departing from the scope of the present invention. The computer 24 preferably has the processing power and functionality of a personal digital assistant (PDA). Indeed, a PDA, such as the Handspring Visor PDA manufactured by Handspring, Inc., or other similar personal digital devices, including a handheld computer or laptop, could be used. Further, the computer 24 could be an embedded device, and the entire processor 20 could be manufactured as a single, small unit having appropriate input and output ports. The data/control interface 26 connects the computer 24 via data/control bus 27 to both the multichannel transceiver 30 and power meter 35. Preferably, the data/control interface 26 is a parallel interface, but other types of connections, such as an RS-232 serial interface or Universal Serial Bus (USB) connection, could be utilized.

Importantly, the processor 20 of the present invention allows data to be transmitted between a wireless (or wired) network connected to the computer 24 and a power line within a dwelling. This allows conventional wired and wireless networks within a dwelling to be expanded using the power lines within dwelling, or to selectively allow data from the network to be transmitted outside of the dwelling. Further, the processor 20 allows power consumption data to be transmitted across a wired or wireless network, and appliance control signals (e.g., X-10 control signals) to be sent across the power line connected to multichannel transceiver 30. Additionally, the computer 24 contains routing functionality to selectively route and filter information between a wireless or wired network and the power line, or between sub-networks on the power line.

The computer 24 of the present invention may be programmed to convert a variety of different information types into different formats for internal and external transmission across wired, wireless, and power line networks. By the terms "internal" and "internally," it is meant transmission of data signals on a network located within the same building where the computer 24 is located. Conversely, by the term "external" and "externally," it is meant transmission of data signals on a network located outside of the building where the computer 24 is located (e.g., to one or more dwellings located in the same community). The conversion procedures performed by computer 24 include, but are not limited to:

1. Selective conversion of internal or external X-10 control signals for internal or external IP transmission. This procedure allows internal or external X-10 control/data signals to be selectively converted to IP traffic for internal or external transmission on a wired, wireless, or power line (e.g., HomePlug) network. The resulting IP traffic can be directed to desired IP addresses using standard router and firewall mechanisms 2. Selective conversion of internal or external IP traffic for internal or external X-10 transmission. This procedure allows internal or external IP traffic to be selectively converted into X-10 control signals for internal or external transmission across a power line network. The user is provided with the ability to select IP traffic (e.g., by IP address, IP destination port, type of IP traffic, and content of IP traffic) to be converted, using a standard firewall mechanism. The resulting X-10 control signals can be directed to desired X-10 devices or codes.

3. Selective conversion of internal or external X-10 control signals for internal or external X-10 transmission. This procedure allows internal or external X-10 control/data signals to be converted for transmission on an internal or external X-10 network. The user has the ability to select the X-10 signals to be converted, based upon one or more codes embedded within the signal and using a standard firewall mechanism. Internal or external X-10 control/data signals can be used to control or pass data to internal or external X-10 devices.

4. Selective conversion of power consumption data for internal or external IP transmission. This procedure allows power consumption data acquired by the present invention to be converted to IP format for internal or external transmission on an IP network. This allows power consumption information to be measured within the building (e.g., at one or more computer stations connected to a home LAN or wireless network), proximal to the building (e.g., a handheld, remote monitoring station having a wireless interface), or external to the building (e.g., by a power utility company via the Internet).

Figure 3:
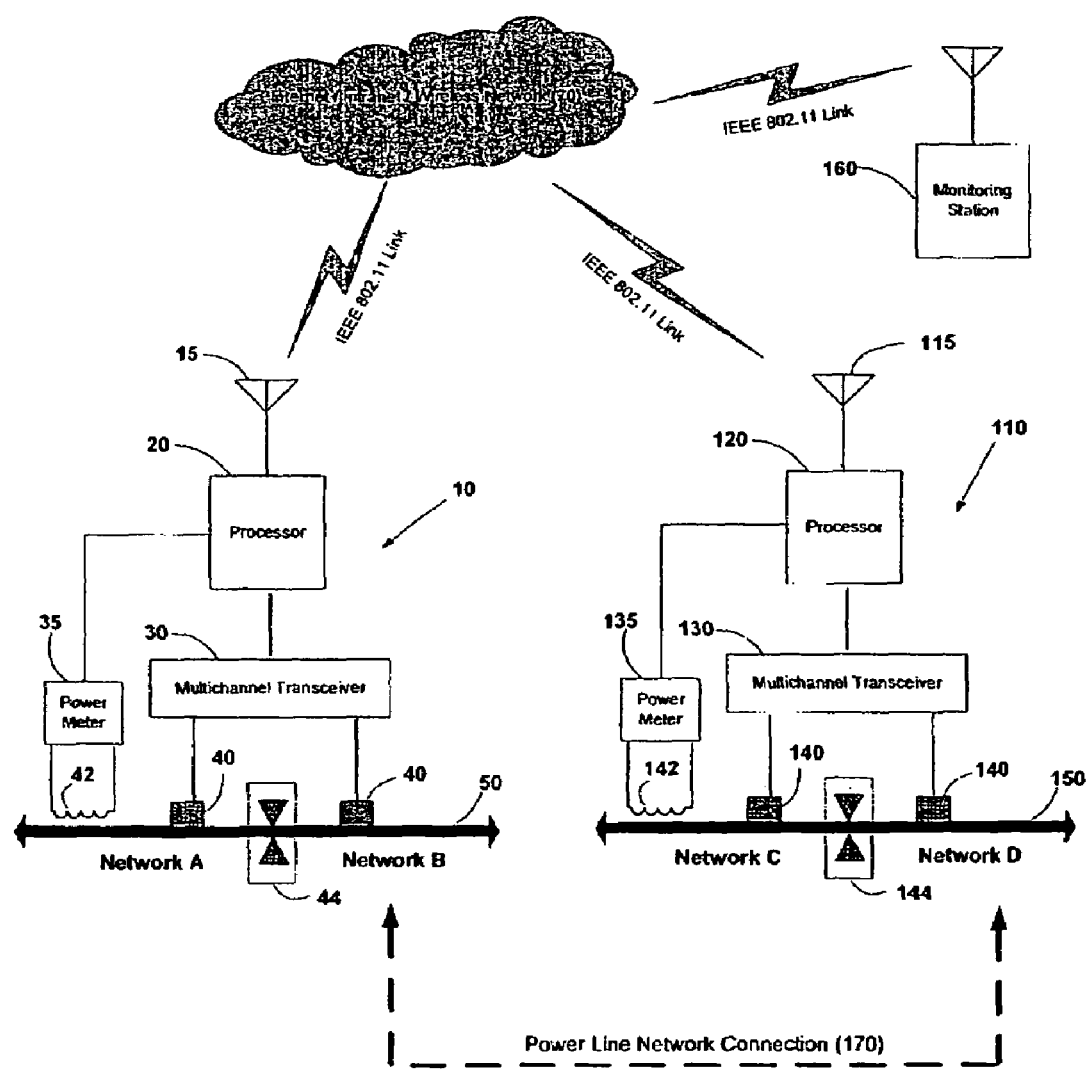
FIG. 3 is a schematic diagram showing communication between two wireless power metering systems according to the present invention and a wireless monitoring station.

FIG. 3 is a schematic showing communication between two wireless power metering systems according to the present invention and a wireless monitoring station. In this arrangement, a first power metering system 10, a second power metering system 110, and a monitoring station 160 communicate using network 70, which may be, for example, a wireless IEEE 802.11 network known in the art. Further, the network 70 can be connected to the Internet, an intranet, or a wired Ethernet connecting the power metering systems 10, 110 and the monitoring station 160.

The first power metering system 10 monitors power consumption on power line 50, which for purposes of illustration, is a power line existing in a first dwelling. The power line 50 has two power line networks A and B, which can be either X-10 sub-networks, IP sub-networks utilizing the HomePlug protocol, or any other type of sub-network. Preferably, power line networks A and B are HomePlug sub-networks that allow for the transmission of IP data thereon. Power consumption data is measured by power meter 35 via transformer 42, and relays same to processor 20. The multichannel transceiver 30 is connected to networks A and B via clamp contacts 40, and allows data to be selectively transmitted and received across networks A and B. The filter 44 prevents stray X-10 signals from network A from interfering with network B, and vice versa. Further, the processor 20, via a wireless interface and antenna 15, can communicate with network 70 to transmit and receive data.

Similarly, the second power metering system 110 monitors power consumption on power line 150, which for purposes of illustration, is a power line existing in a second dwelling. The power line 150 has two power line networks C and D. Preferably, power line networks C and D are HomePlug sub-networks that allow for the transmission of IP data. Power consumption data is measured by power meter 135 via transformer 142, and relays same to processor 120. The multichannel transceiver 130 is connected to networks C and D via clamp contacts 140, and allows data to be selectively transmitted and received across networks C and D. The filter 144 prevents stray X-10 signals from network C from interfering with network D, and vice versa. Further, the processor 120, via a wireless interface and antenna 115, can communicate with network 70 to transmit and receive data.

The monitoring station 160 communicates with network 70 to transmit and receive information between power metering systems 10, 110. The monitoring station 160 could be a stand-alone PC, a handheld PDA with an IEEE 802.11 wireless interface similar to the wireless power meters 10, 110 of the present invention, or any other suitable device. The monitoring station 160 allows for the remote monitoring of power consumption information captured by power meters 10, 110 and transmitted wirelessly to monitoring station 160 via network 70.

The monitoring station 160 could be used by a variety of individuals, including, for example, power utility meter reading personnel or a homeowner. A power utility meter reader could quickly and conveniently monitor power consumption information for a given household by walking near the vicinity of the household, wherein the power consumption information could be transmitted by the wireless power metering system of the present invention to the monitoring station 160. The acquired information could then be logged in the monitoring station 160 for future billing. Further, the monitoring station 160 could be used by a homeowner to monitor power consumption trends within the household and adjust power consumption to minimize utility costs.

Importantly, the power metering systems 10, 110 also allow for the transmission of data, including power consumption data, across the Internet. Thus, power consumption information could be transmitted directly to a power utility by power metering systems 10, 110 for immediate processing and billing, thereby obviating the need for meter reading personnel. Further, appliances within the households connected to the power lines 50, 150 can be selectively activated and de-activated by power metering systems 10, 110 to maximize efficiency, wherein X-10 or other similar control signals are transmitted across power lines 50, 150 and/or networks A–D to control desired appliances within the households.

Moreover, the power metering systems 10, 110 allow for the transmission of non-appliance-related data (e.g., standard IP network traffic) across the power lines 50, 150 and/or networks A–D. For example, IP-based traffic could be selectively transmitted between networks A and B of power line 50 in a first household by power metering system 10. Similarly, traffic could be selectively transmitted between networks C and D of power line 150 in a second household by power metering system 110. A power line network connection 170 could be provided between the two households for allowing the transmission of IP data therebetween, using a standard power line network protocol (e.g., the HomePlug protocol) between the power lines 50, 150. In such an arrangement, both of the power metering systems 10, 110 could be configured to provide firewall services, so that only desired traffic external to each of the households is allowed. Further, both IP-based traffic, including IP-encapsulated power consumption data, can be shared between the power metering systems 10, 110 using network 70.

Figure 4:
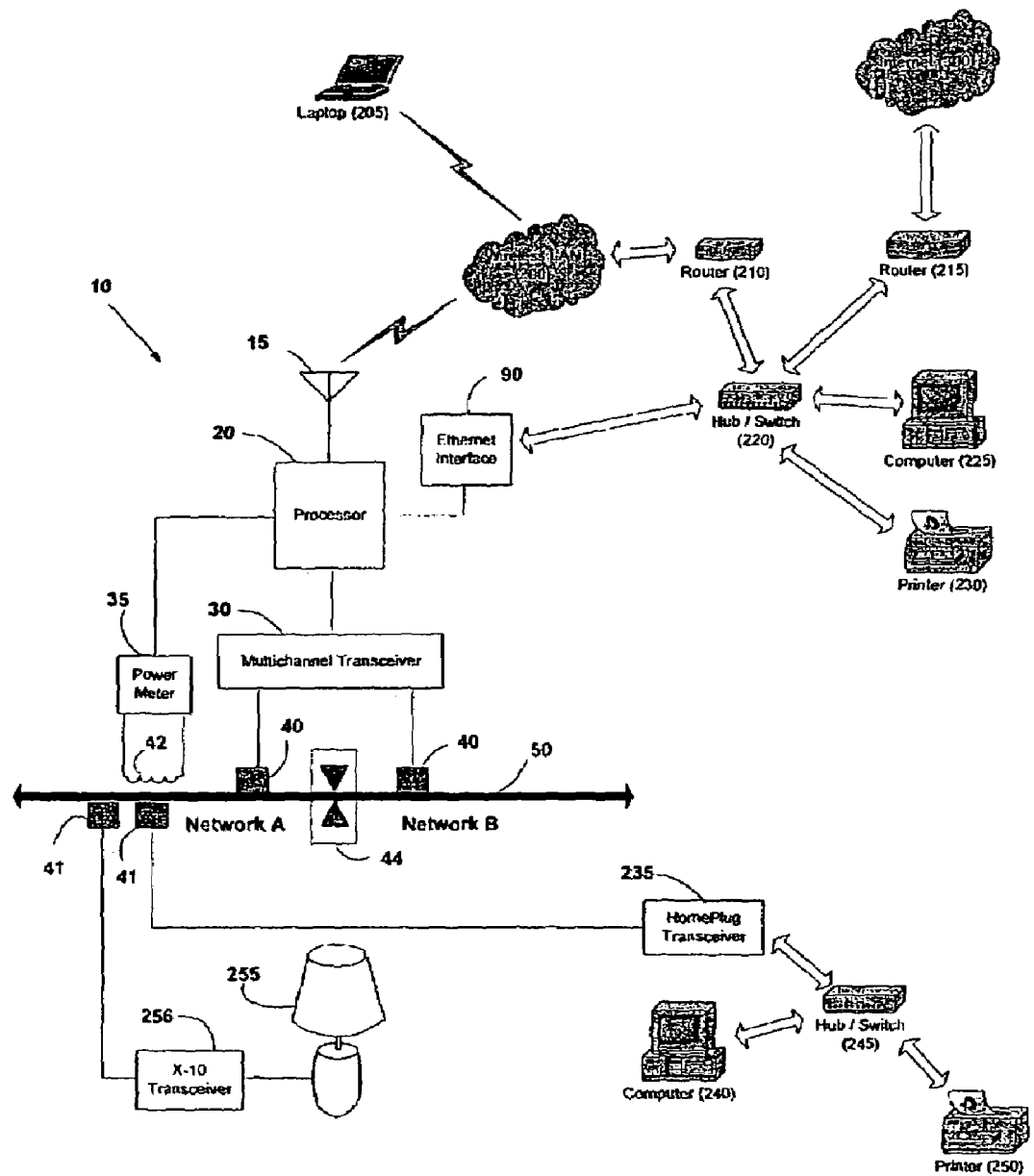
FIG. 4 is a schematic diagram showing the wireless power metering system of the present invention implemented in a household network.

FIG. 4 is a schematic showing the wireless power metering system of the present invention implemented in a household network. As mentioned earlier, the wireless power metering system of the present invention, in addition to providing power consumption measurement, also provides network connectivity for a plurality of devices within a household. Thus, as shown in FIG. 4, a variety of computer devices and peripherals, in addition to an appliance, can be linked using the power metering system 10 of the present invention.

For example, a hub or switch 220 could be set up within a household to link a computer 225 and a printer 230, and to provide connectivity for the household to the Internet 300 via a router 215 (e.g., a cable or DSL modem) connected to the hub/switch 220. Further, a second router 210 could be connected to the hub/switch 220 to provide connectivity to a household wireless LAN 200, so that a laptop 205 having an IEEE 802.11 interface can wirelessly communicate with the computer 225, printer 230, or the Internet 300.

The wireless power metering system 10 of the present invention can be utilized to extend a household network to include additional devices, such as the computer 240, printer 250, and lamp 255, using the power line 50 of the household. The power metering system 10 can communicate with the wireless LAN 200 using an IEEE 802.11 link, or using a wired Ethernet connection between an Ethernet interface 90 and the hub or switch 220. The processor 20 selectively converts IP traffic from wireless LAN 200 or hub/switch 220 for transmission across the power line 50 using power line protocols such as the HomePlug and X-10 protocols, via the multichannel transceiver 30 and clamp contacts 40. Additionally, the processor 20 selectively converts X-10 and HomePlug traffic received from the power line 50 for IP transmission over the wireless LAN 200 or Ethernet interface 90.

The computer 240 and printer 250 are connected to a hub/switch 245, which, in turn, is connected to the power line 50 via a commercially available transceiver 235 and standard wall power outlet 41. The transceiver 235 is similar to a portion of the multichannel transceiver 30, allowing the transmission and reception of data from power line 50 using the HomePlug or other similar protocol. The transceiver 235 could comprise the VS6801 CMOS chip manufactured by Valence Semiconductor, Inc., or other similar chip. In this arrangement, IP-based data can be shared between the computer 240, hub/switch 245, and printer 250 (each of which may be located in a first location of the building (e.g., a den)), and the laptop 205, router 210, hub/switch 220, router 215, computer 225, printer 230, and Internet connection 300 (each of which may be located in a second location of the building (e.g., a basement)).

The lamp 255, or any other appliance within the household and connected to the power line 50 via transceiver 256 and interface 41, can be selectively controlled by X-10 signals generated by the processor 20 or any other X-10 control device connected to power line 50. The transceiver 256 is similar to a portion of the multichannel transceiver 30, allowing transmission and reception of data from power line 50 using the X-10 or other similar protocol. Further, the lamp 225, or any other X-10 equipped appliance connected to the power line 50, can be selectively controlled by signals generated externally or internally to the household, the signals being filtered and routed by the processor 20 in conjunction with the filter 44. Additionally, traffic between networks A and B is filtered by the filter 44. Power consumption information monitored by processor 20 can be accessed within the home by processor 20, laptop 205, computer 225, computer 240, remotely over the Internet 300, by any wireless device in communication with wireless LAN 200, by any wired device connected to hubs/switches 220, 245, or by any device connected to power line networks A or B.

Figure 5:
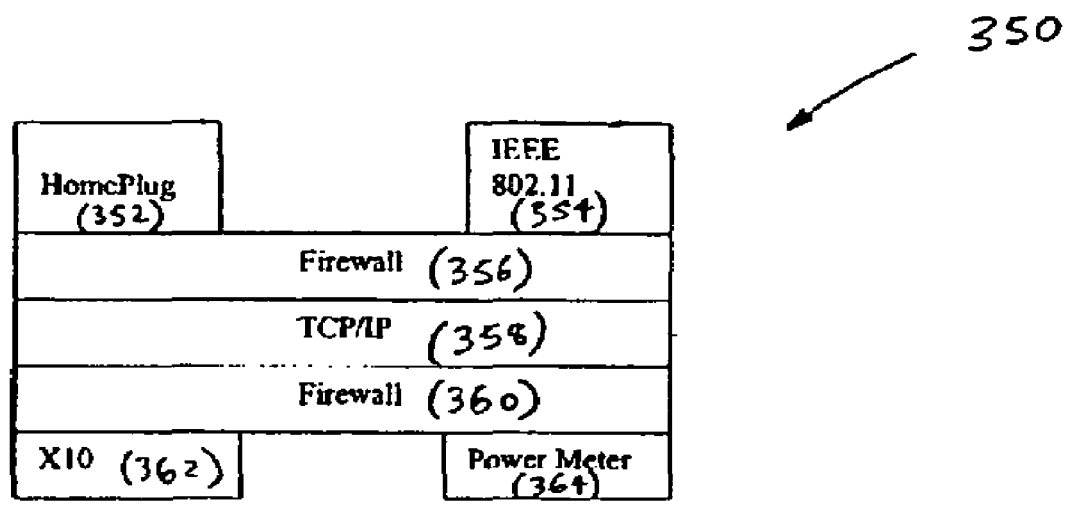
FIG. 5 is a block diagram showing software components of the present invention.

FIG. 5 is a block diagram showing software modules of the present invention, indicated generally at 350. Each of the software modules 350 can be embodied in any digital computer known in the art. In a preferred embodiment of the present invention, software modules 350 reside in non-volatile, random-access memory (RAM), read-only memory (ROM), or other data storage component, such as the computer 24 of the present invention. The core component of the software modules 350 is the Transmission Control Protocol/Internet Protocol (TCP/IP) stack 358, which allows the wireless power metering system of the present invention to communicate using the Internet Protocol, version 4 (IPv4). It is conceivable that TCP/IP stack 358 could be expanded for use with the IPv6 protocol or other future protocol.

Firewall modules 356, 360 interact with TCP/IP stack 360, and accept data from HomePlug module 352, IEEE 802.11 module 354, X-10 module 362, and power meter module 364. The firewall modules 356, 360 provide routing functionality, and control the flow of IP traffic between the modules 352, 354, 362, and 364. HomePlug module 352 accepts incoming IP-base d HomePlug signals and relays same to firewall 356, in addition to generating outgoing HomePlug signals from IP-based traffic provided by firewall 356. IEEE 802.11 module 354 allows IP-based traffic to be wirelessly transmitted and received by firewall 356. X-10 module 362 converts incoming X-10 signals to IP-based traffic and relays same to firewall 360, in addition to generating outgoing X-10 signals from IP-based traffic provided by firewall 360. Power meter module 364 converts incoming power consumption information measured by power meter 35 of the present invention into IP-based traffic, and routes same to firewall 360.

Figure 6:
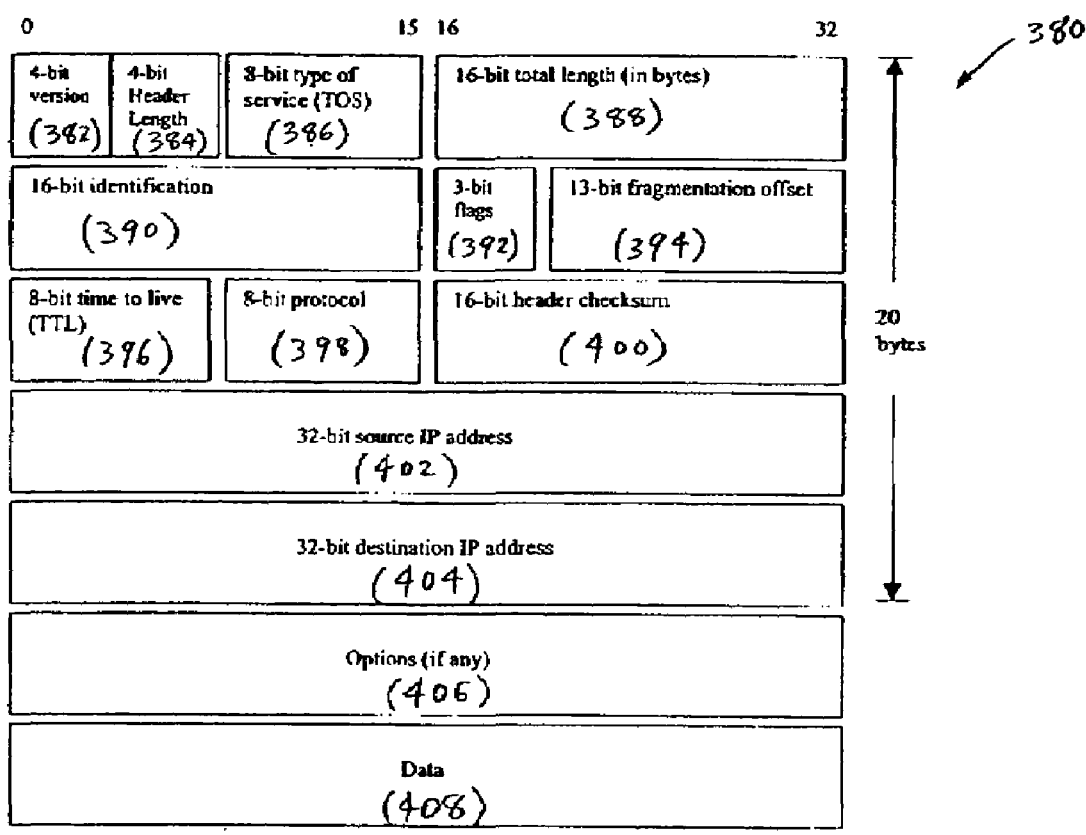
FIG. 6 is a block diagram showing a standard Internet Protocol, Version 4 ("IPv4") packet utilized by the present invention.

FIG. 6 is a block diagram showing a standard Internet Protocol, Version 4 ("IPv4") packet utilized by the present invention and indicated generally at 380. The IPv4 packet 380 comprises a number of sub-components, including version block 382, header length block 384, type-of-service (TOS) block 386, total length block 388, identification block 390, flags block 392, fragmentation offset block 394, time-to-live (TTL) block 396, protocol block 398, header checksum block 400, source IP address block 402, destination IP address block 404, options block 406, and payload data block 408. The present invention stores X-10 control signals and data, and power consumption data in the payload data block 408, thereby encapsulating the data in an IP format and allowing transmission of same across any IP network. For example, the X-10 module 362 of the software modules 350 of FIG. 5 stores X-10 control data in the payload data block 408, thereby converting X-10 data into IP-based data. The power meter module 364 of the software modules 350 of FIG. 5 stores power consumption information in the payload data block 408, thereby converting power consumption information into IP-based data.

Figure 7:
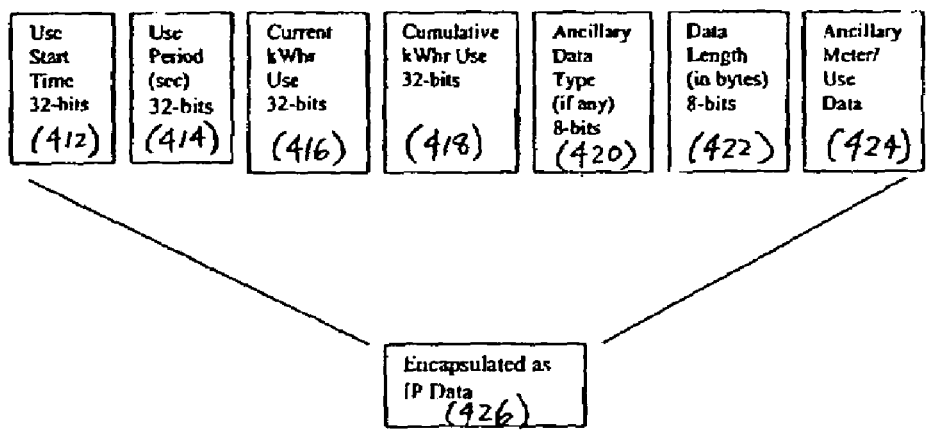
FIG. 7 is a block diagram showing a sample IP packet according to the present invention for transmitting power consumption data.

FIG. 7 is a block diagram showing the data portion of a sample IP packet 410 according to the present invention for transmitting power consumption data. The power consumption data measured by the present invention is stored in a plurality of data blocks 412-424. Block 412 stores the start time of energy consumption for given use period as a 32-bit block. Block 414 stores the use period of energy consumption as a 32-bit block. The kilowatt-hour usage for the current use period is stored as a 32-bit value in block 416. The cumulative kilowatt-hour usage value for all use periods (since setting the meter, or since the last roll-over) is stored as a 32-bit value in block 418. Any ancillary data types (for future expansion or use) are stored as 8-bit values in block 420. The data length of the power consumption message is stored as a 8-bit value in block 422. Finally, any ancillary meter use data is stored in block 424. Each of these components are stored in the payload data block 408 of FIG. 6, resulting in an encapsulated, IP-based power consumption data packet 426 which may be transmitted across any IP-based network.

Figure 8:
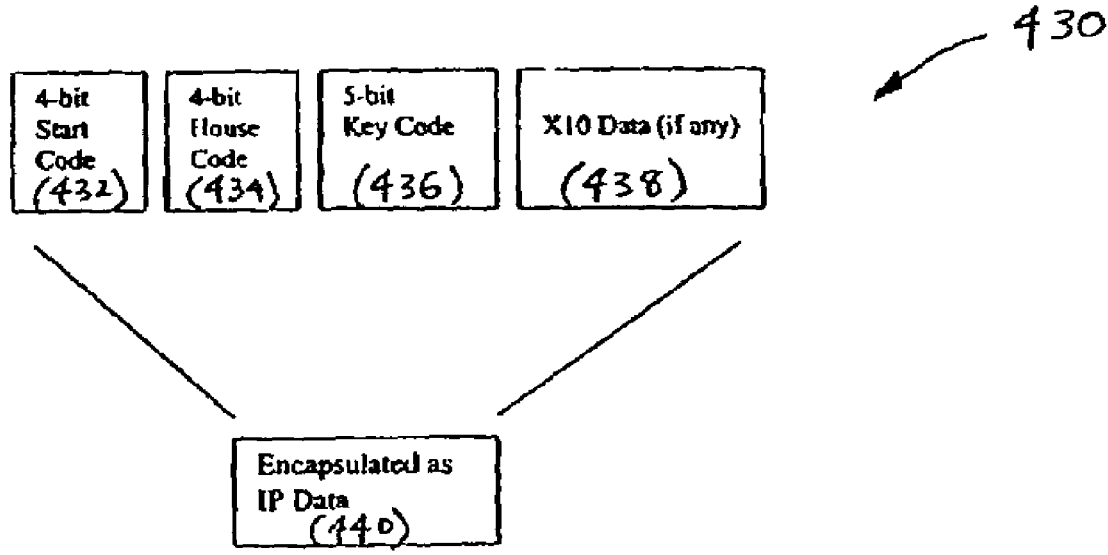
FIG. 8 is a block diagram showing a sample IP packet according to the present invention for transmitting X-10 control data.

FIG. 8 is a block diagram showing the data portion of a sample IP packet 430 according to the present invention for transmitting X-10 control signals or data. As mentioned earlier, X-10 control signals or data are stored by the present invention in the payload data block 408 of FIG. 6, allowing for the transmission of X-10 data as IP-based data. The X-10 control data comprises a 4-bit start code block 422, a 4-bit house code block 434, a 5-bit key code block 436, and X-10 payload data block 438. Each of these blocks are encapsulated to form an IP-based X-10 data packet 440 which may be transmitted across any IP network.

Having thus described the invention in detail, it is to be understood that the foregoing description is not intended to limit the spirit and scope thereof. What is desired to be protected by Letters Patent is set forth in the appended claims.

What is claimed is:

1. An electrical power metering system comprising:
   a power meter coupled with a power line for measuring power consumption data from the power line, the power meter dividing the power line to form an internal network and an external power line network;
   a processor connected to the power meter for converting the power consumption data measured by the power meter into Internet Protocol (IP) data;
   a network interface connected between the processor and the internal network for transmitting and receiving IP data between the processor and the internal network;
   a transceiver connected between the processor and the external power line network for transmitting and receiving IP data between the processor and the external power line network; and
   means for selectively routing IP data between the external power line network and the internal network, said means selectively operable as a firewall for filtering IP data routed between the external power line network and the internal network;
   wherein power consumption information is transmitted autonomously in IP format over the external power line network.

2. The system of claim 1, wherein the transceiver transmits and receives X-10 data and control signals across the external power line network.

3. The system of claim 1, wherein the transceiver comprises a HomePlug power line interface for transmitting and receiving IP traffic between the processor and the external power line network.

4. The system of claim 1, wherein the network interface comprises a wireless interface for transmitting and receiving IP data between the processor and the internal network.

5. The system of claim 1, wherein the external power line network connects to the Internet.

6. The system of claim 1, wherein the power meter further comprises a split-core transformer inductively coupled with the power line.

7. The system of claim 1, wherein the processor comprises a personal digital assistant (PDA).

8. The system of claim 1, wherein the processor filters and routes data between an external source and the internal network.

9. The system of claim 1, wherein the processor converts X-10 data from the external power line network into IP data for transmission across an internal IP network.

10. The system of claim 1, wherein the processor converts IP data into X-10 data and control signals for transmission across the internal network.

11. The system of claim 1, wherein the transceiver further comprises first and second contacts coupled with the external power line network, the first contact allowing communication external to a residence using the external power line network and the second contact allowing communication within the residence using an internal power line network.

12. The system of claim 11, further comprising a filter coupled with the power line and positioned between the first and second contacts for separating internal communications on the internal power line network and external communications on the external power line network.

13. The system of claim 1, further comprising a remote monitoring station for remotely monitoring the power consumption information.

14. The system of claim 13, wherein the remote monitoring station further comprises a wireless interface for transmitting data to and receiving data from the power metering system.

15. The system of claim 1, wherein the power metering system transmits and receives information across the Internet.

16. The system of claim 1, further comprising a wired network interface for connecting the power metering system to a wired network.

17. A method of measuring power consumption information on a power line comprising:
   measuring current fluctuations in the power line;
   calculating power consumption information from the current fluctuations in a processor;
   converting the power consumption information into IP-based power consumption information in the processor; and
   transmitting the IP-based power consumption information from the processor to a destination autonomously in IP format over an external power line network.

18. The method of claim 17, further comprising:
   receiving the IP-based power consumption information at the destination; and
   calculating a utility bill using the IP-based power consumption information.

19. The method of claim 17, further comprising transmitting the IP-based power consumption information over an IP-based network.

20. The method of claim 17, further comprising wirelessly transmitting the IP-based power consumption information from the processor to the destination.

21. The method of claim 17, further comprising:
generating a control signal in the processor in response to the power consumption information;
transmitting the control signal to an appliance; and
controlling the appliance with the control signal.

22. The method of claim 21, wherein the step of controlling the appliance comprises turning the appliance off in response to increased power consumption.

23. The system of claim 1, wherein the electrical power metering system is located at a first location and further comprises a network connection established between the electrical power metering system and a computer at a second location.

24. The system of claim 23, wherein the network connection comprises a wireless connection.

25. The system of claim 23, wherein the network connection comprises a power line connection.

26. The system of claim 23, wherein the network connection allows the computer in the second location to share an Internet connection provided at the first location.

27. A method for providing network connectivity and measuring power consumption information at a residence comprising:
interconnecting a power meter having a processor, a network interface, and a power line transceiver between a power line and an internal network at a residence, the power meter dividing the power line to form the internal network and an external power line network;
selectively routing Internet Protocol (IP) data between the external power line network and the internal network to provide access to the Internet at the residence using the external power line network;
calculating current and cumulative power consumption information at the residence using the power meter; and
converting the power consumption information into IP data for transmission over the Internet autonomously in IP format via the external power line network.

28. The method of claim 27, further comprising selectively filtering IP data between the external power line network and the internal network using a firewall in the power meter.

29. The method of claim 27, wherein the step of converting the power consumption information into IP data comprises encapsulating the power consumption information into one or more IP packets.

30. The method of claim 29, further comprising storing a destination IP address in the one or more IP packets.

31. The method of claim 30, further comprising transmitting the one or more IP packets to a destination specified by the destination IP address using the Internet.

32. The method of claim 30, further comprising simultaneously transmitting the one or more IP packets to a plurality of destinations using the destination IP address.

33. The method of claim 27, further comprising selectively routing IP data from the internal network to a second network at a second residence using the power meter and the external power line network.

34. The system of claim 1, wherein the internal network comprises an internal power line network.

35. The system of claim 1, wherein the power consumption information is one of kilowatt-hour usage for a current use period and cumulative kilowatt-hour usage for all use periods.

36. The system of claim 1, wherein the power consumption information is measured on the external power line network.

37. The system of claim 1, wherein the power consumption information is measured on the internal network.

* * * * *